United States Patent [19]

Carter et al.

[11] Patent Number: 4,897,520

[45] Date of Patent: Jan. 30, 1990

[54] LASER DEBRIS VACUUM SCOOP

[75] Inventors: Ronald H. Carter; Brian F. Walker, both of Blue Springs, Mo.; Michael J. West, Yukon, Okla.; Randall T. Wingerter, Blue Springs, Mo.

[73] Assignee: American Telephone and Telegraph Company, AT&T Technologies, Inc., Berkeley Heights, N.J.

[21] Appl. No.: 265,174

[22] Filed: Oct. 31, 1988

[51] Int. Cl.[4] .............................................. B23K 26/00
[52] U.S. Cl. ............................ 219/121.68; 219/121.78
[58] Field of Search ...................... 219/121.68, 121.69, 219/121.84, 121.67, 121.72, 121.78

[56] References Cited

U.S. PATENT DOCUMENTS

| | | | |
|---|---|---|---|
| 3,441,973 | 3/1976 | Luck, Jr. et al. | 219/121.68 |
| 3,626,141 | 12/1971 | Daly | 219/121.68 |
| 3,742,183 | 6/1973 | Castro et al. | 219/121.84 |
| 3,750,049 | 7/1973 | Dowley et al. | 219/121.84 X |
| 4,315,133 | 2/1982 | Morgan et al. | 219/121.84 |
| 4,319,120 | 3/1982 | LaRocca | 219/121.84 |

*Primary Examiner*—C. L. Albritton
*Attorney, Agent, or Firm*—Les H. Birnbaum

[57] ABSTRACT

Disclosed is a method and apparatus for removing debris caused during laser trimming of films. A vacuum scoop is attached to a movable head which contains the laser optical components. The scoop removes the debris as it is generated and therefore keeps the trimming apparatus essentially clean.

10 Claims, 2 Drawing Sheets

4,897,520

LASER DEBRIS VACUUM SCOOP

BACKGROUND OF THE INVENTION

This invention relates to laser trimming of film circuits.

Part of the standard process for fabricating circuits including thin or thick film resistors involves first depositing the resistor material and subsequently trimming the material by means of a laser to adjust the resistance (see, e.g., U.S. Pat. No. 4,284,970 issued to Berrin, et al). Such a technique provides fairly precise resistance values. However, one problem which exists for thick film resistors is that the material comprises a paste which creates a great deal of debris during the laser trimming operation. This debris tends to deposit over much of the trimming apparatus necessitating periodic cleaning which is costly and results in significant "down" time. Furthermore, the generation of such debris prevents use of the apparatus in clean room environments required for most modern electronic component fabrication. Finally, the conversion from a thick film to a thin film trimming operation is time consuming and costly as a result of the cleanup required.

It is, therefore, an object of the invention to provide a method and apparatus for clean trimming of film material.

SUMMARY OF THE INVENTION

This and other objects are achieved in accordance with the invention which, in one aspect, is an apparatus for trimming film material. The apparatus comprises a movable head containing optical components for directing a laser beam toward said material. Also included is a vacuum scoop mounted to the head so as to remove debris from the surface of the material caused by the incidence of the laser beam thereon.

In accordance with another aspect, the invention is a method for trimming film material. A laser beam is directed to localized portions of the material by moving a head containing optical components which focus said beam onto said desired portions. The debris caused by the laser beam is removed from the localized portions of the material by means of a vacuum scoop mounted to the head.

BRIEF DESCRIPTION OF THE DRAWING

These and other features of the invention are delineated in detail in the following description. In the drawing

It will be appreciated that for purposes of illustration these figures are not necessarily drawn to scale.

DETAILED DESCRIPTION OF THE INVENTION

Figure 1:
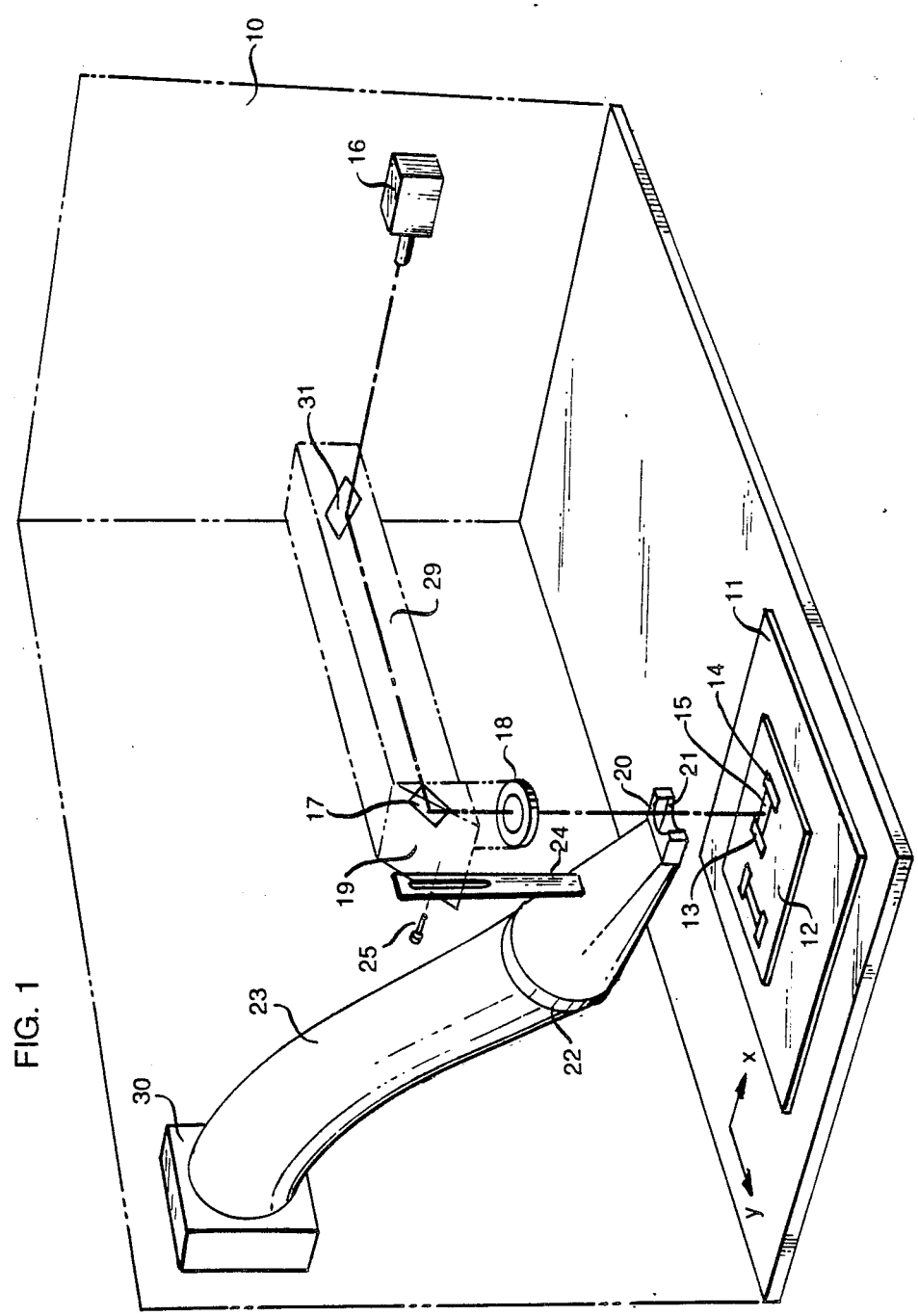
FIG. 1 is a perspective, partly schematic, view of a portion of an apparatus according to one embodiment of the invention.

FIG. 1 illustrates one form of apparatus including the invention. The apparatus includes a metal chamber 10 within which is disposed a mounting table 11 capable of moving in both the x and y directions as illustrated in the figure. Mounted on the table is an illustrative thick film circuit which includes a ceramic substrate 12, a pair of thick film conductive contact pads 13 and 14, and a thick film resistor material, 15. Two resistors are shown in the figure for the sake of simplicity. It will be appreciated that a typical circuit would include many more resistors, as well as capacitors, conductors and semiconductor components.

Trimming of the resistor material is accomplished by means of a laser device, illustrated as 16, which emits a high intensity beam in a direction usually parallel to the table 11. The beam is diverted by some means such as mirrors 17 and 31 and focused by some means such as lens 18 onto the surface of the material. The laser beam cuts through the material in the vertical direction and produces a cut extending in either or both the length and width dimension of the resistor to change the resistance between the two contact pads 13 and 14. In order to move the focused beam along the resistor, at least some of the optical components, such as 17 and 18 in this example, are mounted in a head 19. The head is attached to an arm 29 (also including mirror 31) which is movable in the x and y directions by some means (not shown) such as linear motors.

In practice, the substrate, 12, includes several circuits. A particular circuit is positioned beneath the head by the x-y table 11. Once the table is positioned, the head is set in motion to define the cutting path for each resistor. This typically requires moving the head at a speed of approximately 0.7–40 mm per second during the cutting. When it is necessary to position the head above another resistor in the circuit, a much greater speed is desired, typically, as fast as 1600 mm per second. The head is usually balanced about a bearing (not shown) on the bottom of the optic arm 29 on which the arm travels. The particular apparatus employed was a commercially available machine sold by ESI under the designation Model 44 Laser Trimmer.

Figure 2:
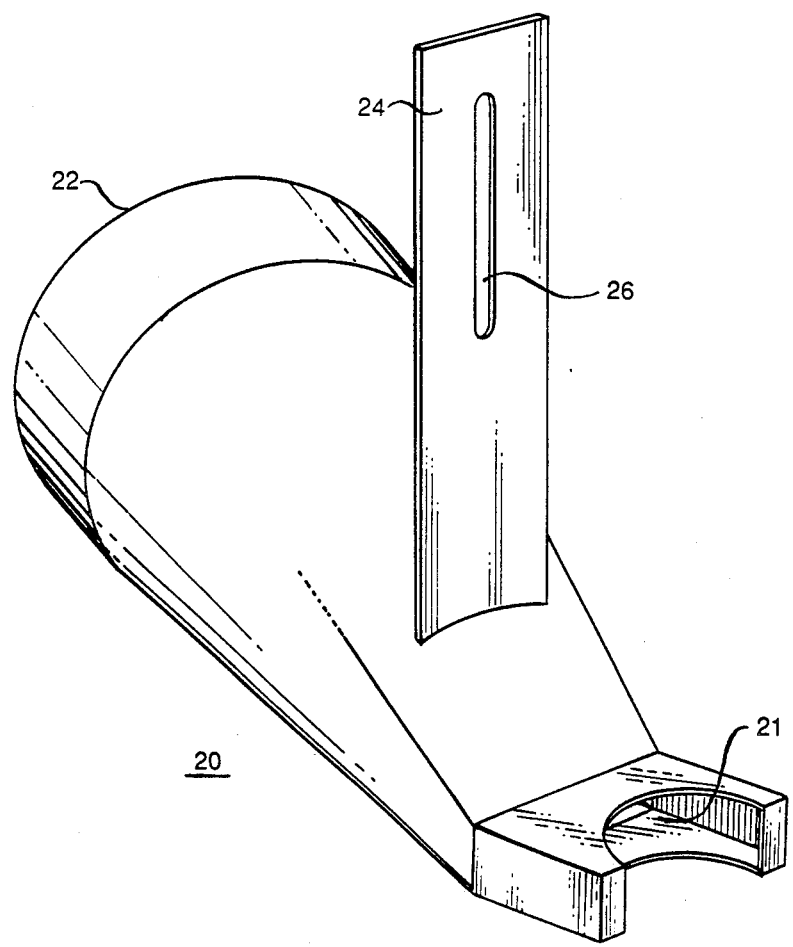
FIG. 2 is a perspective view of a portion of the apparatus of FIG. 1.

In order to remove the debris generated by the laser cutting, a vacuum scoop 20 is mounted directly to the head 19. The scoop includes an opening, 21, at one end which is semi-cylindrical, so as to wrap around a portion of the laser beam during cutting of the film material. In this example, the opening extends approximately 180 degrees in the plane of the opening parallel to the table 11 (see FIG. 2). The other end of the scoop has a cylindrical opening 22 which is coupled to a flexible hose 23. The hose extends out of the chamber to some exhaust means, illustrated as fan 30.

The scoop further includes a flange, 24, which is welded to the body of the scoop. The flange is attached to the head, 19, by means of a rotatable knob 25 extending through an opening 26 in the flange. The scoop and flange are typically made of aluminum, but other lightweight materials are suitable.

During the laser trimming operation, the lens 18 is typically brought to within 4–5 cm of the substrate surface. The opening 21 is, therefore, within 1.7–2.7 cm of the surface. The proximity of the scoop to the localized area being trimmed, as well as the semi-circular wraparound design of the opening, results in any debris being collected from the surface of the resistors, 15, as soon as it is generated. The exhaust is typically 250–350 ft$^3$ per minute which provides sufficient vacuum to ensure removal of all debris. The scoop does not appear to hinder movement of the head in spite of the need for rapid movement and sharp changes in direction during trimming.

Since essentially all the debris is collected before it has a chance to deposit on other areas of the apparatus, the machine can be placed in a clean room environment with other equipment used to fabricate thin film and hybrid circuits as well as semiconductor chips.

While the invention has been described in terms of trimming thick film material, it will be appreciated that it may also be useful for trimming other films, such as thin film materials.

Various additional modifications will become apparent to those skilled in the art. All such variations which basically rely on the teachings through which the invention has advanced the art are properly considered within the scope of the invention.

We claim:

1. Apparatus for trimming film materials comprising:
   a movable head containing optical components for directing a laser beam toward said material; and
   means mounted to said head for removing debris from the surface of the material caused by the incidence of the laser beam thereon, said means consisting essentially of a vacuum scoop mounted to said head, a flexible hose having one end mounted to the scoop, and exhaust means coupled to the other end of the hose.

2. Apparatus according to claim 1 wherein the scoop includes a semi-cylindrical opening at one end which partially surrounds the laser beam.

3. Apparatus according to claim 1 wherein the scoop is mounted to the head by means of a flange attached to the body of the scoop.

4. Apparatus according to claim 1 wherein the head is adapted to move at speeds up to 1600 mm per second.

5. Apparatus according to claim 1 wherein the scoop is made of a material comprising aluminum.

6. A method for trimming film material comprising:
   directing a laser beam to desired localized portions of said material by moving a head containing optical components which focus said beam onto said desired portions; and
   vacuuming the debris caused by the laser beam from the localized portions of the material by means of a vacuum scoop mounted to said head without any gas flow directed to the localized portions.

7. The method according to claim 6 wherein the film material is a thick film resistor.

8. The method according to claim 6 wherein the head is moved at a speed of 40–1600 mm per second.

9. The method according to claim 6 wherein a vacuum of approximately 250–350 per ft$^3$ per minute is formed in the scoop.

10. The method according to claim 6 wherein the scoop is 1.7–2.7 cm from the surface of the film during trimming.

* * * * *